US007007018B1

(12) United States Patent
Kirkwood et al.

(10) Patent No.: US 7,007,018 B1
(45) Date of Patent: Feb. 28, 2006

(54) BUSINESS VOCABULARY DATA STORAGE USING MULTIPLE INTER-RELATED HIERARCHIES

(75) Inventors: Michael Kirkwood, San Francisco, CA (US); Sima Yazdani, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 590 days.

(21) Appl. No.: 09/823,819

(22) Filed: Mar. 30, 2001

Related U.S. Application Data

(60) Provisional application No. 60/252,378, filed on Nov. 20, 2000.

(51) Int. Cl.
G06F 17/30 (2006.01)

(52) U.S. Cl. .................. 707/5; 707/102; 707/104.1
(58) Field of Classification Search ................ 707/100, 707/102, 104.1, 10, 2–5
See application file for complete search history.

(56) References Cited

U.S. PATENT DOCUMENTS

| | | | |
|---|---|---|---|
| 5,251,314 A | 10/1993 | Williams | |
| 5,283,894 A | 2/1994 | Deran | |
| 5,386,556 A | 1/1995 | Hedin et al. | |
| 5,404,506 A | 4/1995 | Fujisawa et al. | |
| 5,584,024 A | 12/1996 | Shwartz | |
| 5,594,837 A | 1/1997 | Noyes | |
| 5,644,740 A | 7/1997 | Kiuchi | |
| 5,696,916 A | 12/1997 | Yamazaki et al. | |
| 5,740,425 A | 4/1998 | Povilus | |
| 5,752,023 A * | 5/1998 | Choucri et al. ............... | 707/10 |
| 5,875,443 A | 2/1999 | Nielsen | |
| 5,907,837 A | 5/1999 | Ferrel et al. | |
| 5,924,090 A | 7/1999 | Krellenstein | |
| 6,038,560 A | 3/2000 | Wical | |
| 6,085,187 A | 7/2000 | Carter | |
| 6,139,201 A | 10/2000 | Carbonell et al. | |
| 6,154,213 A * | 11/2000 | Rennison et al. ........... | 345/854 |
| 6,209,095 B1 | 3/2001 | Anderson et al. | |
| 6,230,173 B1 | 5/2001 | Ferrel et al. | |
| 6,256,627 B1 | 7/2001 | Beattie et al. | |
| 6,315,572 B1 * | 11/2001 | Owens et al. ............... | 434/322 |
| 6,324,536 B1 | 11/2001 | Rofrano | |

(Continued)

OTHER PUBLICATIONS

Jon Anthony, "Ariadne White Paper: I-Synthesizer, Core Technology Review", Mar. 30, 2001, Version 1.1, Synquiry Technologies, Ltd, pp. 1-36.

(Continued)

*Primary Examiner*—Safet Metjahic
*Assistant Examiner*—Brian Goddard
(74) *Attorney, Agent, or Firm*—Hickman Palermo Truong & Becker, LLP

(57) ABSTRACT

Techniques for responding to a request for data from a server operated by an entity or enterprise on a network include generating and storing a first concept in association with a first relationship of a first relationship type, which relates concepts in a first category, and a second relationship of a second relationship type, which relates concepts in a second category; and responding to the request based on the first concept and the second relationship. The request is based on an enterprise-specific vocabulary of names and relationships among the names. The names are of solutions, technologies, products, services and activities, or any other information associated with the entity. The first concept is one of a plurality of atomic concepts among names in the enterprise-specific vocabulary. The first concept is associated with a first category of a plurality of categories that encompass the enterprise-specific vocabulary.

51 Claims, 7 Drawing Sheets

U.S. PATENT DOCUMENTS

| | | | |
|---|---|---|---|
| 6,327,593 B1 * | 12/2001 | Goiffon | 707/102 |
| 6,349,275 B1 | 2/2002 | Schumacher et al. | |
| 6,397,217 B1 | 5/2002 | Melbin | |
| 6,438,540 B1 | 8/2002 | Nasr et al. | |
| 6,453,312 B1 | 9/2002 | Goiffon et al. | |
| 6,453,315 B1 * | 9/2002 | Weissman et al. | 707/5 |
| 6,480,860 B1 | 11/2002 | Monday | |
| 6,510,406 B1 | 1/2003 | Marchisio | |
| 6,510,434 B1 | 1/2003 | Anderson et al. | |
| 6,519,588 B1 * | 2/2003 | Leschner | 707/3 |
| 6,539,376 B1 | 3/2003 | Sundaresan et al. | |
| 6,556,982 B1 * | 4/2003 | McGaffey et al. | 706/50 |
| 6,629,097 B1 * | 9/2003 | Keith | 707/5 |
| 6,665,662 B1 | 12/2003 | Kirkwood et al. | |
| 6,675,159 B1 | 1/2004 | Lin et al. | |
| 6,735,593 B1 * | 5/2004 | Williams | 707/102 |
| 2003/0131007 A1 * | 7/2003 | Schirmer et al. | 707/100 |
| 2004/0034651 A1 | 2/2004 | Gupta et al. | |
| 2004/0181756 A1 | 9/2004 | Berringer et al. | |

OTHER PUBLICATIONS

Susan Mael, "Synquiry Brings Context and Merchandising to E-Commerce Sites", The Online Reporter, Apr. 23-27, 2001, Issue No. 244, pp. 1-3.

* cited by examiner

BUSINESS VOCABULARY DATA STORAGE USING MULTIPLE INTER-RELATED HIERARCHIES

CROSS-REFERENCE TO RELATED APPLICATIONS

This application is related to and claims domestic priority from prior U.S. Provisional application Ser. No. 60/252,378, filed Nov. 20, 2000, the entire disclosure of which is hereby incorporated by reference as if fully set forth herein.

This application is related to United States utility U.S. Pat. No. 6,665,662 B1 filed on Mar. 30, 2001, entitled "Query Translation System for Retrieving Business Vocabulary Terms" filed on the same day herewith, by inventors M. Kirkwood et al., which is hereby incorporated by reference in its entirety.

FIELD OF INVENTION

The present invention generally relates to data processing in the field of vocabulary management as applied to content, applications, contextualization of information resources, supporting workflow management, and Web publishing. The invention relates more specifically to a metadata representation of information or concepts, as represented in multiple inter-related hierarchies.

BACKGROUND OF THE INVENTION

Through economic growth, mergers and acquisitions, business enterprises are becoming ever larger. Further, large business enterprises in the field of high technology now offer ever larger numbers of products and services that derive from an increasingly large variety of technologies.

In this environment, managing the categorization, creation, use, and maintenance of the company's intellectual assets, such as products and technologies is an acute problem. As an enterprise grows, maintaining consistent usage of names of products and services, and other types of company data, throughout the enterprise becomes even more challenging. When an enterprise derives its business opportunities from research and development into new technologies or improvements of existing technologies, maintaining consistent categorization and usage of technology designations is a challenge, especially when there is disagreement or confusion about the uses, advantages or benefits of a particular technology. Such confusion can arise whether disagreements arise or not, as when there is no communication between different teams within an enterprise.

The World Wide Web is one communication medium that exacerbates the problem, by showing internal information to the enterprise's partners and customers. Large enterprises that own or operate complex Web sites or other network resources that contain product and technology information face a related problem. Specifically, ensuring consistent usage of product names and technology terms across a large, complicated Web site is problematic. A particular problem involves maintaining consistent use of terms when different parts or elements of the Web site applications are created or content is authored by different individuals or groups.

Yet another problem in this context pertains to retrieving product information and technology information. Visitors to the large enterprise Web site do not necessarily know the "official" name of a product or technology. As a result, new visitors tend to query the Web site for product information based on incorrect terms, imprecise terms, related terms, or names that are unofficial. When a visitor searches using the wrong product name, the visitor is unable to retrieve quality product information, and the visitor may become frustrated. However, this is undesirable from a promotional standpoint; the customer should be able to issue a "wrong" query and yet still retrieve the correct information.

Based on the foregoing, there is a clear need for improved ways to categorize, represent, describe and manage one or more vocabularies of all company business practices and pertaining to all business terminology ("concept"), including but not limited to product names and technology terms. In particular, there is a need for a way to categorize, structure information so that it can be located and navigated easily. There is also a need for a way to share and propagate changes to name and vocabulary information.

There is a specific need for a clear and consistent way to develop new brands, trademarks, names for solutions or services, etc., that promotes consistency in terminology, style and presentation.

There is a need for a way to deliver information that is relevant to a user query in response to non-standard or alternative terms.

There is also a need for a simple, automated, unified and consistent way to manage usage of product names and technology terms in business documents, applications, and online resources such as Web sites.

There is also a need for a management system based on data and rules that can control processes through which new terminology representing business concepts is created, control the format and style of the names, and manage development of names and designations of relationships by expert or interested individuals who are distributed among many groups of a large enterprise, or who are outside the enterprise.

There is also need for a system that is extensible or adaptable when new business practices, products or technologies are developed by diverse, distributed groups in a large business enterprise.

SUMMARY OF THE INVENTION

The foregoing needs, and other needs and objects that will become apparent from the following description, are achieved in the present invention, which comprises, in one aspect, a method of responding to a request for data from a server operated by an enterprise on a network. The request is based on an enterprise-specific vocabulary of names and relationships among the names. The names are of enterprise products and services and activities, and any other category of business data. A first concept is generated and stored in association with a first relationship of a first relationship type and a second relationship of a second relationship type. A response to the request is made based on the first concept and the second relationship. The first concept is one of multiple atomic concepts among names in the enterprise-specific vocabulary. The first concept is associated with a first category of multiple categories that encompass the enterprise-specific vocabulary. The first relationship type relates at least two concepts associated with the first category. The second relationship type relates at least one of the two concepts related by the first relationship with at least one different concept.

In another aspect, the invention comprises a method of responding to a request for data from a server operated by an enterprise. The server manages data that includes multiple categories of information. The request is based on a value in a first category. The data requested belongs to a second category. A first concept is generated and stored in association with a first relationship of a first relationship type and a second relationship of a second relationship type. A response to the request is made based on the first concept and the second relationship. The first concept is one of multiple atomic concepts among the data managed by the server, and is associated with the first category. The first relationship type relates at least two concepts associated with the first category. The second relationship type relates at least one of the two concepts related by the first relationship with at least one concept associated with the second category.

In another aspect, a method for processing enterprise categories of data generated by an enterprise includes generating and storing a first concept in association with a first relationship of a first relationship type and a second relationship of a second relationship type. The first concept is one of a plurality of atomic concepts within the enterprise vocabulary. The first concept is associated with a first category of a plurality of categories that encompass the enterprise data. The first relationship type relates at least two concepts of the plurality of atomic concepts associated with the first category. The second relationship type relates at least one of the two concepts related by the first relationship with at least one different concept of the plurality of atomic concepts.

In another aspect of the invention, a method of processing enterprise data generated by an enterprise includes generating a plurality of categories that encompass the enterprise data. A plurality of atomic concepts are generated within the enterprise data. A first relationship type is generated to relate at least two concepts of the plurality of atomic concepts associated with a first category of the plurality of categories. A second relationship type is generated to relate at least one of the at least two concepts related by the first relationship type to at least one different concept of the plurality of atomic concepts. A particular concept of the plurality of atomic concepts associated with the first category is stored. A first relationship of the first relationship type is generated with the first concept. A second relationship of the second relationship type is generated with the first concept. The first relationship and the second relationship are stored in association with the first concept.

The invention also allows the enterprise to direct and lead its market base toward the significance and uniqueness of its products, services, solutions and technology in the marketplace. Managing the enterprise business vocabulary and categorizing enterprise data, processes and organizations in that context provides a strong foundation for building semantically rich interfaces between information systems and sources supporting that enterprise, and facilitates commerce with its customers and partners outside the company.

In other aspects, the invention encompasses computer readable media, and systems configured to carry out the foregoing steps.

This invention yields concepts connected to multiple inter-related hierarchies and allows users to efficiently navigate through the enterprise data both to express the user's particular needs and also to find products and services that meet the user's particular needs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
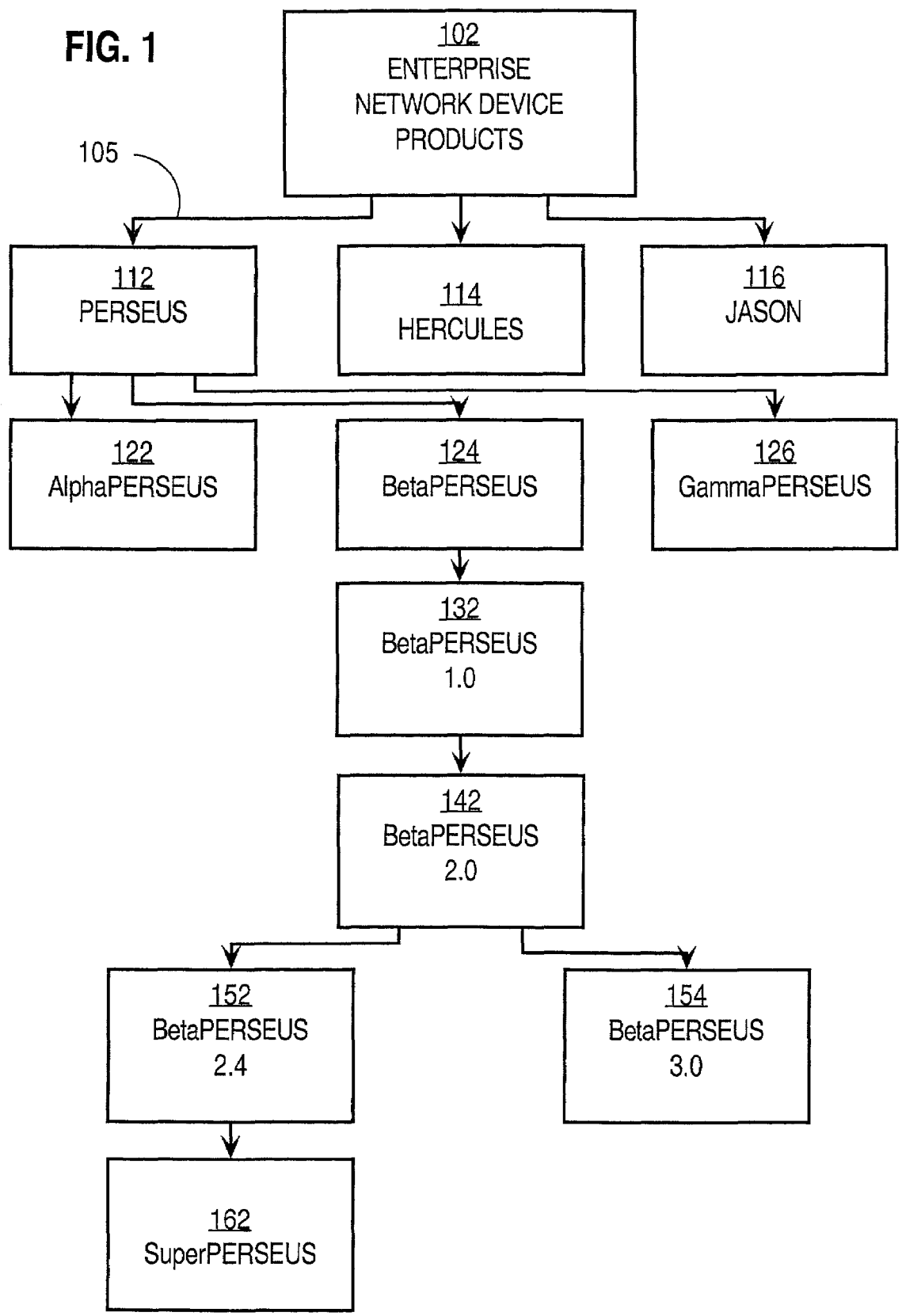
FIG. 1 is a block diagram that illustrates a hypothetical product type hierarchy according to one embodiment

A method and apparatus for storing business vocabulary data using multiple inter-related hierarchies are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Business Vocablary Data Processing

Business vocabulary terms are used to name products, product lines, technologies, people, processes, application services, systems, content types, presentation formats, development efforts and other business activities of an enterprise. Some of the vocabulary terms are used only internally and some are used for interaction with the public to establish brand name recognition or to support precise communication of customer interests and orders. Terms related in meaning or form are used to associate related business products and activities in the minds of the users of those terms. For example, a device sold by an enterprise might be named Perseus, after a hero of Greek mythology, and a software program for executing on that device might be named Pegasus, after the winged horse Perseus rode. Similarly, different models of the Perseus device might be called AlphaPerseus and BetaPerseus, to show they are part of the same product line, while different versions of each model may be numbered, such as BetaPerseus 2.0 and BetaPerseus 2.4.

The present invention is based in part on a recognition that the business terms of an enterprise constitute an important type of business data that should be included in the automated data processing that the enterprise performs. This vocabulary data about the products, services and activities of a business is a form of metadata for the products, services and activities of the enterprise. Those terms can be used to categorize the products, services and activities and to retrieve other data about those products, services and activities. The data structures employed to store, retrieve and process this metadata should account for the associations in meaning and form and support rapid associative or inferential search and retrieval.

2.0 Vocabulary Development Framework

According to the present invention, the various terms that constitute the business vocabulary of an enterprise are modeled as nodes in a hierarchy called the MetaData Framework (MDF) or the Vocabulary Development Framework (VDF). In this framework, any business term that is derived from another particular business term is positioned in the hierarchy at a node that branches from the node of that particular business term from which it is derived. When the hierarchy is embodied in stored data with appropriate data structures and software programs, it is extremely useful in naming products and associating products with product lines.

For example, FIG. 1 shows a hypothetical product type hierarchy for a hypothetical enterprise that manufactures and sells network devices. In this hierarchy, node 102 is a root node representing network device products sold by the enterprise. Node 102 has three child nodes, 112, 114, 116 that are connected by arrows 105. The parent/child relationship is denoted by an arrow pointing from parent to child in FIG. 1. A relationship statement can be obtained reading from arrow head to arrow tail by the words "is a child of" or read in the opposite direction by the words "is a parent of." Thus node 112 is a child of node 102. Node 102 is a parent of node 112. In the product type hierarchy of FIG. 1, arrow 105 represents the product type parent/child relationship.

Node 112 represents the devices named "Perseus." In this embodiment, the content of node 112 includes "Perseus." Nodes 114, 116 represent devices named "Hercules" and "Jason," respectively. FIG. 1 shows that the Perseus device comes in three models, "AlphaPerseus," "BetaPerseus" and "GammaPerseus," represented by the three nodes 122, 124, 126, respectively. The BetaPerseus model has evolved over time through versions 1.0, 2.0 and 3.0, represented by nodes 132, 142, 154, respectively. The contents of these nodes hold the names "BetaPerseus 1.0," "BetaPerseus 2.0," and "BetaPerseus 3.0," respectively. BetaPerseus 2.0 also experienced some evolutions called "BetaPerseus 2.4" and "SuperPerseus," which are represented by nodes 152, 162, respectively.

This hierarchy consists of binary relationships; that is, each relationship requires one parent and one child. The product type relationships of FIG. 1 are constrained by a rule that each child may have only one parent. There is no rule restricting the number of children a parent may have in this hierarchy.

Various applications use the information in the VDF implementation to perform different functions for the enterprise. In one application, the VDF relationships in the illustrated hierarchy are used to determine that the product named "SuperPerseus" is actually a version of the BetaPerseus model that is based on version 2.4. In another application, the VDF content is used to help provide names for products as new products are developed by automatically including the product type and model name and by preventing the re-use of an existing version number. Embodiments of this application enforce a rule that each name shall be unique within that hierarchical category. The enterprise uses the VDF with other embodiments of such an application to enforce other naming rules, such as requiring the model name shall be part of the device name. In this case the ambiguous name "SuperPerseus" is not allowed, and is discarded in favor of the automatic name, "BetaPerseus 2.5", or some allowed variation of that, which is stored as the content of node 162.

The vocabulary development framework (VDF) captures simultaneous multiple relationships among names, products, solutions, services, documentation and activities for an enterprise. In particular, the VDF allows other relationships to be established between nodes simultaneously with the product type relationship. Furthermore, the VDF allows any of these new relationships to involve more than the two nodes of the binary parent-child relationship already described. For example, it allows a ternary relationship among a father node, a mother node, and a child node. In general, the VDF allows N-ary relationships among nodes, where N is any integer equal to or greater than one and specifies the number of participants in the relationship.

In the more general realm of the VDF, the enterprise is considered a data domain that includes many atomic concepts that may be related. Atomic concepts include any data item involved in the enterprise that is not subdivided into separately referenced storage units. These atomic concepts include the business vocabulary for the enterprise data that is the subject of the present invention. Concepts include product type names, as in the above example, but also comprise paragraphs, chapters, documents, images, multimedia files, database records, database queries, network resources, citations, and network addresses, among other things. The concepts and relationships are captured in conceptual graphs which are organized primarily by a partial-order relationship, commonly known as a type hierarchy. The concepts are nodes in the graph and the relationships are connections between two or more nodes. Both concepts and relationships have enumerated characteristics in some embodiments.

The graph of FIG. 1 is an example of a conceptual graph ordered by its product type hierarchy of binary (parent-child) relationships. Whereas this is one example based on a product type hierarchy, the VDF allows for simultaneous and inter-related multiple type hierarchies, as is explained in more detail in the following sections.

2.1 Multiple Hierarchies

As seen above in FIG. 1, concepts are related in a graph depicting product types. All the concepts in this graph are associated with one category of information in the enterprise data. That category is device product types, and that hierarchy relates concepts for products that are related in development history, structure or function. However, enterprise data may include other categories or relationships. In general, multiple categories encompass the enterprise data. For example, some of the enterprise data for an enterprise that manufactures and sells network devices are related to equipment solutions for common networking problems encountered by customers of the enterprise. Products of the enterprise that are unrelated by the hierarchy of FIG. 1 nevertheless may be useful to solve the same kind of customer problem. Thus, such products relate to the same solution. To reflect these relationships, enterprise data also are placed in a category called networking solutions in one embodiment, and are organized in a solutions hierarchy that exists concurrently with the product type hierarchy.

Figure 2A:
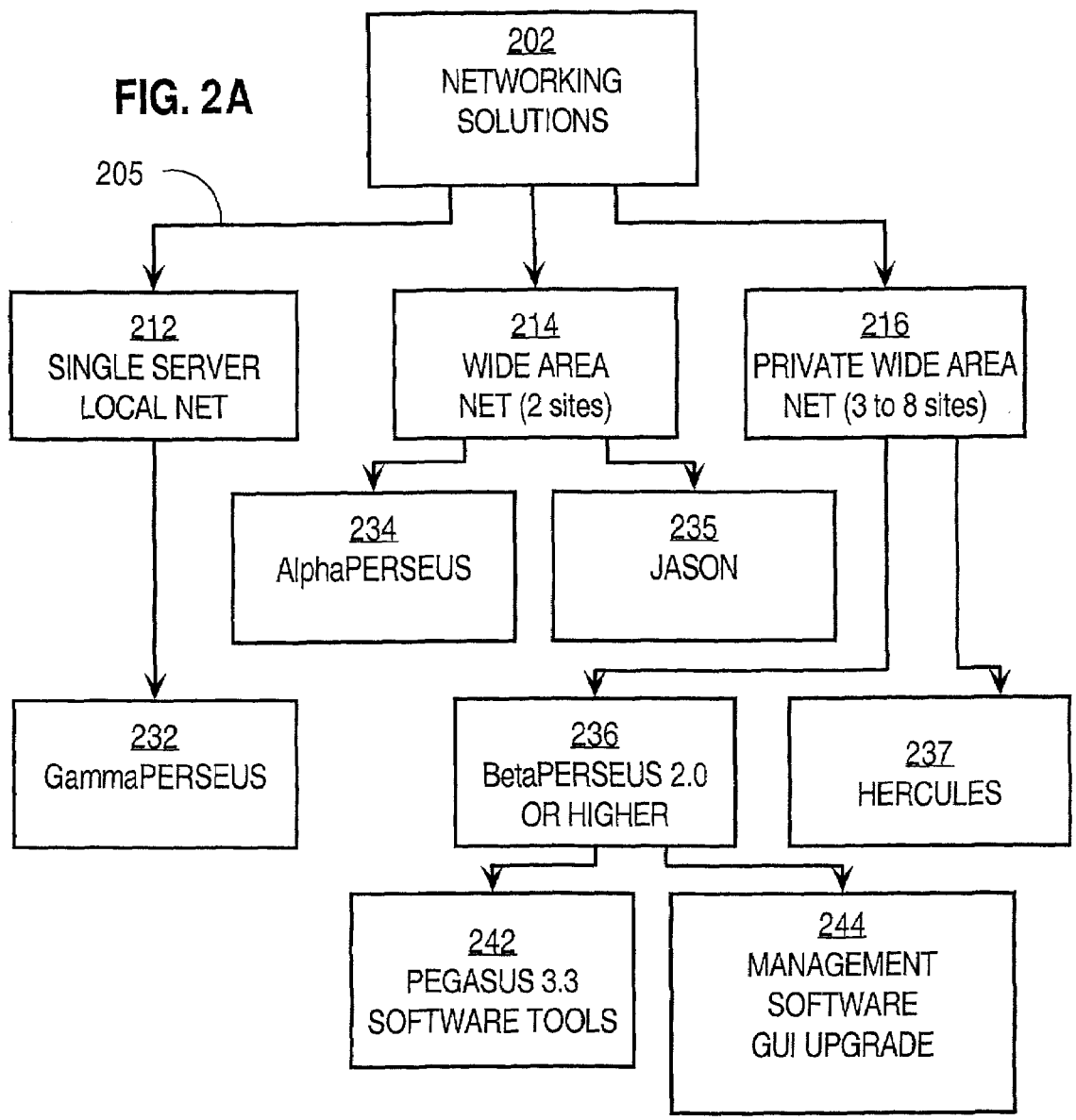
FIG. 2A is a block diagram that illustrates a networking solutions hierarchy including one or more concepts from the product type hierarchy of FIG. 1 according to one embodiment.

FIG. 2A depicts an example hierarchy of concepts in a networking solutions category. In this example, three solutions expressed by the concepts "single server local net," "wide area net (2 sites)" and "private wide area net (3 to 8 sites)" are stored in the content of nodes 212, 214, 216, respectively. All three nodes are children of the root node 202 having content "networking solutions" for this category of concepts. In the solutions type hierarchy of FIG. 2A, arrow 205 represents a networking solutions parent/child relationship. All the relationships represented by arrows in FIG. 2A are of this type. This relationship type differs from the product type parent/child relationship represented by arrow 105 of FIG. 1. Both relationship types are parent/child binary relationships, but they relate concepts in different categories.

As shown in the example of FIG. 2A, the product GammaPerseus, at node 232, is part of the equipment solution for single server local networks of node 212. Both AlphaPerseus, at node 234 and Jason at node 235 are part of the equipment solution for wide area networks connecting two sites, at node 214. BetaPerseus 2.0, at node 236, and Hercules, at node 237, are part of the equipment solution for private wide area networks connecting three to eight sites represented by node 216. Nodes 242 and 244 represent software products Pegasus 3.3 and a graphical user interface (GUI) upgrade that are installed on the BetaPerseus 2.0 device in addition to the default software that comes with that device.

The concepts at nodes 202, 212, 214, 216 may be placed in a category called networking solutions. The concepts 232, 234, 235, 236, 237 have already been placed in a category called enterprise device products; but they may also be placed in the category networking solutions. The concepts at nodes 242, 244 may be placed in a category called software products and also in the networking solutions category. FIG. 2A demonstrates that hierarchies of concepts in categories of enterprise data may be defined in addition to the hierarchy of concepts in the product type category, and demonstrates that categories may overlap.

Alternatively, non-overlapping categories are used in other embodiments. In such an embodiment, the relationship represented by arrow 205 is expressed as a relationship of a sub-component to a component of a networking solution, in which the sub-component may be a different category than the component. Rules can be expressed for the relationship. One possible rule is: software can be a sub-component of hardware, but not the other way around. Similarly, a product can be a sub-component of a networking solution category but not the other way around.

2.2 Non-Binary Relationships

Figure 2B:
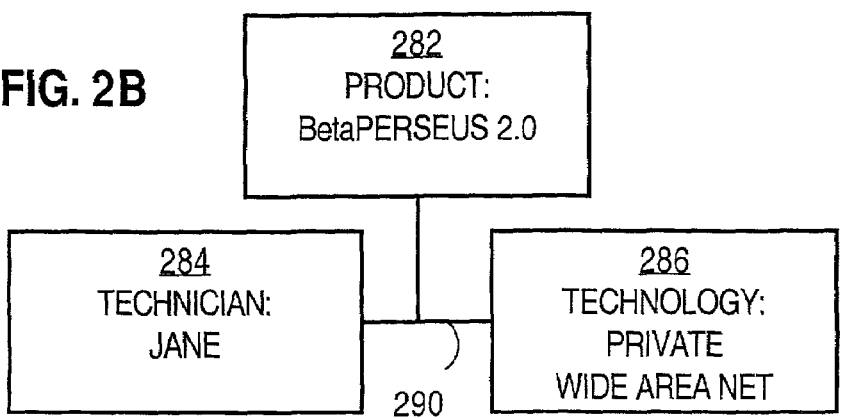
FIG. 2B is a block diagram that illustrates a non-binary relationship among concepts according to one embodiment.

FIG. 2B depicts a conceptual graph of an example non-binary relationship. This ternary relationship (also called a 3-ary relationship or three participant relationship) is useful for capturing the expertise of a person in the use of a product in a technology area. In this example, this relationship is used to state whether the expertise of a technician in the use of a product device within a technology area is of a quality that can assume values of "unknown," "poor," "average," "good," or "excellent."

The characteristics of the relationship type describe the number of participants and their category or categories. In this example the relationship type includes characteristics that indicate there are three participants, one from the user category, one from the technology category and one from the product device category. In addition, the characteristics of this relationship include at least one relationship value for storing the quality of expertise (unknown, poor, average, good, excellent). More details on defining and storing concepts and relationships are given in a later section.

The conceptual graph of this relationship in FIG. 2B shows three nodes 282, 284, 286 representing the three concepts, e.g., product BetaPerseus 2.0, technology private wide area network, and technician Jane, respectively. The three nodes are connected by a three-way, non-directional link 290. The link 290 includes an attribute named "quality" that takes on a value such as "good," indicating that Jane's expertise is good for using BetaPerseus 2.0 in private, wide area networks.

2.3 Documentation Category

Another category of concepts that is extremely useful to an enterprise, for both internal and external users, is documentation concepts, which encapsulate elements of electronic or tangible documents. Concepts within a documentation category include headings, sections, paragraphs, drawings, and images, among others. Documentation concepts also express the type of content in terms of what it says; for example, documentation concepts include but are not limited to "Introduction," "Features & Benefits," "Product Photo," etc. Documentation concepts may be organized in a hierarchy that facilitates automatically generating accurate, complete, up-to-date visual or printed documentation pertaining to a particular product or service. For example, a device, like the hypothetical Beta Perseus 2.0, can be linked by a relationship to a document concept describing the device. As another example, a device, like the Beta Perseus 2.0, can be linked by a relationship to a section concept in a document hierarchy for a document concept describing the networking solutions of which the device is a component. More examples of document categories of concepts are given in a later section.

2.4 Multiple Inter-Related Hierarchies

As seen in the above examples, a single concept, such as the device product BetaPerseus 2.0 may appear in several separate hierarchies. According to one embodiment, information defining the concept is stored only once in the VDF and relationships are defined to all other nodes to which the concept is adjacent in all the hierarchies.

Hierarchies may be implemented using object-oriented programming techniques and database modeling and tools. One advantage of this approach is that changes to the concept can be made in only one location in the VDF and all hierarchies relating to that concept immediately become up-to-date and reflect the changes. Further, all information generated based upon the hierarchies, such as documentation or screen displays, automatically reflects the changes.

Another advantage is that applications that retrieve the data can navigate one of the hierarchies to a particular concept and then immediately find the other hierarchies in which that concept occupies a node. Thus, a customer who has purchased a particular device product for one networking solution can determine other solutions that use that same device. The customer follows the current solution to the product and then reviews the relationships with other networking solutions of interest to the customer that utilize the device. When a networking solution of interest is found using the device, the newly found solution can be navigated above and below the node representing the device concept in order to determine what software and other devices, if any, are components and sub-components of the new solution. Further, the customer can search by solution and identify multiple products that can satisfy the solution. The customer can then inspect each of the products, obtain its documentation, and determine which product is best suited to the customer's particular needs. Such information is synchronized with the customer's online profile so that it is available for later reference and can be personalized.

Figure 3:
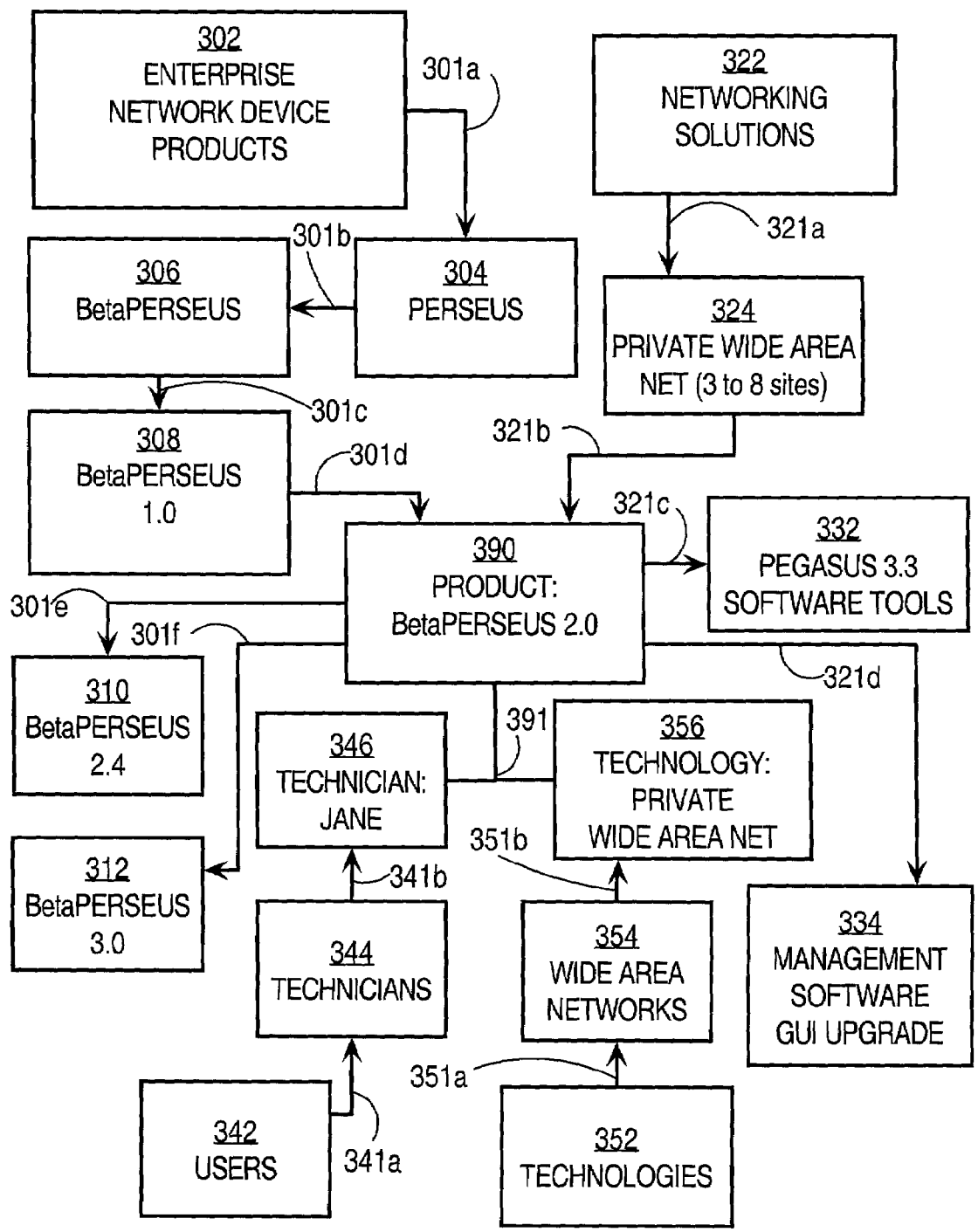
FIG. 3 is a block diagram illustrating simultaneous multiple inter-related hierarchies involving a product type concept according to one embodiment.

FIG. 3 is an example of a conceptual graph for multiple inter-related hierarchies that are associated with the device product BetaPerseus 2.0, based on the individual hierarchies and relationships of FIG. 1, FIG. 2A and FIG. 2B. The branch of the device product type hierarchy of FIG. 1 that includes the BetaPerseus 2.0 device concept appears as nodes 302, 304, 308, 390, 310 and 312 linked by the device product type, binary parent/child relationships 301. The branch of the device networking solutions hierarchy of FIG. 2A that includes the BetaPerseus 2.0 device appears as nodes 322, 324, 390, 332 and 334 linked by the networking solutions type, binary parent/child relationships 321. The 3-participant expertise relationship 391 links the node 390 for the BetaPerseus 2.0 to the concept "Jane" at node 346 and the concept "private wide area networks" at node 356. Also shown is that the concept "Jane" at node 346 is a child of the concept "technicians" at node 344 which is a child of the concept "users" at node 342. These nodes are linked by user type, binary parent/child relationships represented by arrows 341. Also shown is that the concept "private wide area networks" at node 356 is a child of the concept "wide area networks" at node 354 which is a child of the concept "technologies" at node 352. These nodes are linked by technology type, binary parent/child relationships represented by arrows 351.

The BetaPerseus 2.0 concept at node 390 is linked to the following nodes in multiple inter-related hierarchies. The BetaPerseus 2.0 concept at node 390 is a product type child of the BetaPerseus 1.0 concept at node 308, as represented by arrow 301d. The BetaPerseus 2.0 concept at node 390 is a product type parent of the BetaPerseus 2.4 concept at node 310, as represented by arrow 301e, and the BetaPerseus 3.0 concept at node 312, as represented by arrow 301f. The BetaPerseus 2.0 concept at node 390 is further a solutions type sub-component of the private wide area net (3 to 8 sites) concept at node 324, as represented by arrow 321b. The BetaPerseus 2.0 concept at node 390 has solutions type sub-components of the Pegasus 3.3 software tools concept at node 332, as represented by arrow 321c, and the management software GUI upgrade concept at node 334, as represented by arrow 321d. The BetaPerseus 2.0 concept at node 390 has two companion expertise type participants as represented by link 391; one at Jane represented by node 346 and one at private wide area networks represented by node 356. In all, the example concept at node 390 has 6 binary relationships and one ternary relationship with eight nodes in four hierarchies (product type, equipment solutions, users and technologies). Each of the concepts and relationships may be represented using stored data in a database or appropriate programmatic data structures.

Many of the other nodes in FIG. 3 may have relationships with other hierarchies in addition to the relationships shown. These other relationships are omitted so that FIG. 3 and this discussion are more clear. Multiple relationships similar to the examples listed for node 390 may be defined for these other nodes.

2.5 Root Concepts

At the top of each hierarchy for each category is a category root node representing the category root concept from which all the other concepts in the category branch. For convenience in navigating from one category to the next, each of the category root nodes is made a child of an enterprise data root node representing a top-level pseudo-concept for the enterprise data. In one embodiment, the pseudo-concept is "Vocabulary," and every node related to the Vocabulary concept by a direct "child of" relationship is a root node representing a root concept for one category.

2.6 Implementation of the VDF

One embodiment uses a rule-base and declarative computation approach to express the concepts, relationships and rules of the VDF. This approach may be implemented using a high level computer programming language. In one embodiment, the approach is implemented using a logic expression language such as PROLOG™. An advantage of using a high level logic expression language is that it translates statements declaring types and statements expressing rules about combining types into another lower level language, such as the C programming language, that can be compiled and run on a large variety of general-purpose computer platforms.

In this embodiment, the concepts, relationships, attributes and logical implications (including integrity constraints and general computations) are expressed as logical assertions. There are two kinds of logical assertions, facts and rules. A fact is a logical assertion that is considered unconditionally true. A rule is a logical assertion whose truth or lack of truth depends on the truth or lack thereof of other assertions. In this implementation, concepts, relationships and attributes are generally represented as facts, whereas logical implications are represented using rules.

2.6.1 Defining Concepts

For example, in one embodiment, a statement declaring that the phrase BetaPerseus 2.0 is a concept is presented in a high level logical processing language by the expression:

('BetaPerseus 2.0', is Concept)

Similar expressions are used to enter the other concepts in the vocabulary.

The concept may have several attributes besides the phrase that defines it. For example the concept may have a creation date and an author. Attributes of a concept are presented with the following expression:

('BetaPerseus 2.0', 'creation', 'Sep. 19, 2000', 'author', 'John Smith')

2.6.2 Defining Relationships

The relationships that constitute a hierarchy connect one concept to one or more other concepts. Relationships are defined with the following expression:

(r('ConceptX', 'ConceptY', 'ConceptZ'), relationship (rID))

where r is a name for the relationship type, ConceptX, ConceptY and ConceptZ are the three concepts related by this statement, making the relationship r a ternary relationship, and this particular relationship has a unique relationship identification number rID. To ensure uniqueness, the value of rID is supplied when the relationship is defined by the system processing the logical expression. Using this expression, the "product type child of" relationship can be defined by the statement:

(product_child_of ('BetaPerseus 2.0', 'BetaPerseus 1.0'), relationship (rID2)).

According to this statement, the relationship rID2 links BetaPerseus 2.0 to BetaPerseus 1.0 by a relationship of relationship type "product_child_of."

The ternary relationship of FIG. 2B is defined, after each of the individual concepts are defined, by the expression:

(expertise('BetaPerseus 2.0', 'Jane', 'wide area networks'), relationship (rID3).

According to this statement, the relationship rID3 links the concept BetaPerseus 2.0 with the concept 'Jane' and the concept 'wide area networks' by a relationship of type "expertise."

Similarly, a marketing document stored as a Web page on a network and identified by its universal resources Locator (URL) address 'http:///www.Enterprise.com/literature/devices/catalog/Chap2/'is related to the concept 'BetaPerseus 2.0' by the expression:

(marketDoc('BetaPerseus 2.0', 'http:///www.Enterprise.com/literature/devices/catalog/Chap2/'), relationship (rID4))

The system returns a unique value for rID4, which is used to reference this particular relationship of type marketDoc in later statements.

The relationships defined above can also be given attributes according to this embodiment. Typical relationship attributes include the author of the relationship and the date the relationship is created. These attributes are set for a relationship having an unique identification of rID1 with the expressions:

(rID1, 'creator', 'John Dow')
(rID1, 'date', 'Oct. 10, 2000').

Relationships may have other attributes. For example, the expertise relationship defined above has an attribute for the quality of the expertise, which, in the instance of Jane on wide area networks for the BetaPerseus2.0, is good. This attribute is expressed in this embodiment as follows (rID3, 'quality', 'good')

where rID3 is the unique identification for the expertise relationship among Jane, BetaPerseus 2.0 and wide area networks returned by the system when the relationship was created, as described above.

A relationship can also be defined for other relationships. For example, a relationship of type "revision" is used to track changes in another relationship.

(revision (rID5, rID6), relationship (rID7))

The use of the revision relationship is illustrated in the following. If the marketing document for the BetaPerseus 2.0 is changed to a different URL, 'http:///www.Enterprise.com/Hell/Chap2/', a new relationship is formed by the statement (marketDoc('BetaPerseus 2.0', 'http:///www.Enterprise.com/Hello/Chap2/'), relationship (rID8))

To show that his new relationship with identification rID8 is just a revision of the old relationship with identification rID4 (see above), the revision relationship type is used as follows:

(revision (rID4, rID8), relationship (rID9))

Now, relationship rID9 associated with old relationship rID4 can be used to determine the new relationship rID8 that replaces the old relationship rID4.

2.6.3 Defining Rules

The hierarchies that relate concepts may have to follow certain rules. For example, as stated above, the product type hierarchy requires that a child have only one parent. These rules are enforced using logical constraints defined in a high level logical expression language as rules. A constraint that detects multiple parents in a set of expressions in the high level logic expression language of one embodiment is given by the expression:

(constraint(ConceptC, multiparent (ConceptP1, conceptP2)))
   if(ConceptC, childOf, ConceptP1), (ConceptC, childOf, ConceptP2), ConceptP1~=ConceptP2.

which reads, ConceptC has multiple parents ConceptP1 and ConceptP2 if ConceptC is a child of ConceptP1 and ConceptC is a child of ConceptP2 and ConceptP1 is not equal to ConceptP2. A statement is inserted which throws an error if the multiparent constraint is detected.

Another example of a rule that is enforced in the high level logical language as a constraint is the rule that every concept must be a descendent of a root concept. As described above, a root concept is a concept that is a child of the pseudo concept "Vocabulary." A concept is a descendent of the concept Vocabulary if the concept Vocabulary is reachable from the concept by a succession of one or more "child of" relationships. If the concept Vocabulary cannot be reached from a given concept, then the given concept is an orphan concept. Orphan concepts are a violation of the rules for the product type hierarchy and generally result from errors in concept definitions or are introduced when a parent concept is deleted from the hierarchy. This constraint depends on a definition of "reachable." Reachable is defined as follows:

(reachable(ConceptX,ConceptY)) if (ConceptX, childOf, ConceptY)
(reachable(ConceptX,ConceptY)) if (reachable(ConceptX,ConceptW)), (reachable (ConceptW,ConceptY))

which reads, ConceptX reaches ConceptY either if ConceptX is a child of ConceptY or if there is a ConceptW such that ConceptX reaches ConceptW and ConceptW reaches ConceptY. The constraint is then expressed as follows:

(constraint (ConceptC, orphanConcept)) if ~(reachable (ConceptC, 'Vocabulary')) which reads, CocneptC is an orphan concept if ConceptC does not reach the pseudo concept "Vocabulary." A statement is inserted which throws an error if the orphanConcept constraint is detected.

As discussed above, the example expressions presented in this section are processed by the high level logical processing system to generate code, such as C language code, that implements the concepts, relationships and constraints defined in these expressions. The C language code can then be compiled and executed on any computer system with a C compiler. Further, the C language code can be incorporated in other application programs or compiled into libraries having functions that are called from separate application programs. However, it is still possible to implement the same functionality using other procedural or object-oriented languages such as Java®.

3.0 Vocabulary Database

A vocabulary database provides persistent storage for the concepts, relationships, and rules of the vocabulary data framework for the enterprise data.

One embodiment uses a relational database to store the concepts and the relationships among concepts and the rules, however, any suitable data store can be used. In one specific embodiment, a cached data store is used. A relational database uses a schema to describe a series of tables each made up of one or more rows, each made up of one or more fields. The schema names the table and the fields of each row of the table. An example relational database schema to implement the VDF according to one embodiment is described below. In some embodiments the relational database includes a unique row identification number (rowID) for each row in each table.

In this embodiment, a vocabulary table includes a row for each root concept in the VDF. The fields of each row include the concept name, the concept description and the creation date, as shown in Table 1. A unique rowID may also be included in each row but is not shown in the example tables. Example root concepts are included in several rows of

TABLE 1

The Vocabulary Table

| Root Category Name | Description | Creation Date |
|---|---|---|
| Product | Product category | 4/12/2000 |
| User | User category | 4/12/2000 |
| Technology | Technology Category | 5/15/2000 |
| Solution | Networking Solutions Category | 1/01/2001 |

Each root concept in the vocabulary table has its own table comprising one row for every concept within the category. All concepts that are descendants of the root concept via the "child of" relationship are stored in the table defined by the root concept. Table 2 is an example Table for the Product root concept.

TABLE 2

The Product Category Table

| Name | Description | Creation Date |
|---|---|---|
| Network Device Products | Enterprise devices | 4/12/00 |
| Perseus | router product | 4/12/00 |
| Hercules | gateway product | 4/12/00 |
| Jason | hub product | 4/12/00 |
| AlphaPerseus | router product | 4/12/00 |
| BetaPerseus | router product | 6/16/00 |
| BetaPerseus 1.0 | router product | 6/16/00 |
| GammaPerseus | router product | 9/19/00 |
| BetaPerseus 2.0 | router product | 9/19/00 |
| BetaPerseus 2.4 | router product | 12/12/00 |
| BetaPerseus 3.0 | router product | 1/01/01 |
| SuperPerseus | router product | 2/01/01 |

Several tables are employed to store relationships. These tables support N-ary relationships. The relationship type table holds one row for each relationship type, as illustrated in Table 3 for some sample relationship types described above. The table rows include fields for the name of the relationship type, as used in the high level language or conceptual graphs, a fuller description of the relationship, the number of participants and the creation date.

TABLE 3

The Relationship Types Table

| Relationship Type Name | Description | Number of Participants | Creation Date |
|---|---|---|---|
| product_child_of | product lineage | 2 | 4/12/2000 |
| solution_child_of | solution lineage | 2 | 4/12/2000 |
| user_child_of | user categories | 2 | 4/12/2000 |
| technology_child_of | technology lineage | 2 | 4/12/2000 |
| Expertise | expertise of person with product in technology | 3 | 1/01/2001 |
| MarketDoc | Marketing document for product | 2 | 9/19/2000 |
| Revision | track revisions in concepts/relationships | 2 | 2/01/01 |

The participant type table holds one row for each role of a participant type in a relationship type, as illustrated in Table 4 for the example relationships of Table 3. This table has a row for each participant of each relationships type. Each row has fields for the name of the relationship type, the role of the participant in the relationship, and the participant type, which is the category of the concept that may fill the given role in the relationship type.

TABLE 4

The Participant Types Table

| Relationship Name | Role | Participant Type |
|---|---|---|
| product_child_of | child | Product |
| product_child_of | parent | Product |
| solution_child_of | child | Networking Solution/Product |
| solution_child_of | parent | Networking Solution/Product |
| user_child_of | child | User |
| user_child_of | parent | User |
| technology_child_of | child | Technology |
| technology_child_of | parent | Technology |
| expertise | person | User |
| expertise | product | Product |
| expertise | technology | Technology |
| marketDoc | product | Product |
| marketDoc | document | Document |
| revision | old version | Vocabulary/relationshipID |
| revision | new version | Vocabulary/relationshipID |

The relationship instance table (Rinstance table) and the participant instance table (Pinstance table) have entries for every instance of the relationships as they are defined for the enterprise data. An example Rinstance table is shown in Table 5 and an example Pinstance table is shown in Table 6, for some of the relationships described above. When a particular relationship is defined between two or more concepts, a new relationship identification (rID) is generated. In one embodiment the particular relationship ID, rID, is the unique rowID corresponding to the next row in the Rinstance table.

TABLE 5

The Relationship Instance (Rinstance) Table

| rID | Relationship Type Name | Creation Date |
|---|---|---|
| 5000 | product_child_of | 9/19/2000 |
| 5001 | marketDoc | 9/19/2000 |
| 5002 | product_child_of | 9/19/2000 |
| 5003 | expertise | 9/19/2000 |
| 5004 | marketDoc | 9/20/2000 |
| 5005 | revision | 9/20/2000 |

When a "product child of" relationship is created between the BetaPerseus 2.0 and BetaPerseus 1.0 on Sep. 19, 2000, an entry is made into a row of Table 5 and a unique rID of "5000" is generated by the system. Then two rows are added to Table 6 for the two concepts that participate in the "product child of" relationship that has just been added to Table 5. Those two rows each list in the rID field the rID value of "5000" generated for this relationship. One row is generated in Table 6 for the concept BetaPerseus 2.0 in the participant role of child for rID "5000." A second row is generated in Table 6 for the concept BetaPerseus 1.0 in the participant role of parent for rID "5000."

TABLE 6

The Participant Instance (Pinstance) Table

| rID | role | Participant |
|---|---|---|
| 5000 | child | BetaPerseus 2.0 |
| 5000 | parent | BetaPerseus 1.0 |
| 5001 | product | BetaPerseus 2.0 |
| 5001 | document | http:///www.Enterprise.com/literature/devices/catalog/Chap2/' |

TABLE 6-continued

The Participant Instance (Pinstance) Table

| rID | role | Participant |
|---|---|---|
| 5002 | child | BetaPerseus 2.4 |
| 5002 | parent | BetaPerseus 2.0 |
| 5003 | person | Jane |
| 5003 | product | BetaPerseus 2.0 |
| 5003 | technology | private wide area net |
| 5004 | product | BetaPerseus 2.0 |
| 5004 | document | http:///www.Enterprise.com/Hello/Chap2/ |
| 5005 | old version | 5001 |
| 5005 | new version | 5004 |

On the same date, in this example, the new product is related to its marketing document with the marketdoc relationship that gets rID "5001." Its participants are listed in Table 6 on the two rows having rID "5001." Later that day a new product_child_of relationship is generated for BetaPerseus 2.4 and receives rID "5002." Its participants are listed in the two rows of Table 6 with rID of "5002." Then the expertise relationship of Jane using the BetaPerseus 2.0 in private wide area networking is established on the same day and gets an rID of "5003." The three participants of that relationship are added to Table 6 in the three rows with an rID value of "5003." The next day, on Sep. 20, 2000, a new marketing document is associated with the product by generating a new marketdoc relationship that receives the rID of "5004." The product and document participants are added to Table 6 in the rows showing an rID value of "5004." Finally, the revision of the marketing document is memorialized with the revision relationship, which receives an rID of "5005." The two participants of the revision relationship are added as two rows to Table 6 having an rID value of "5005" in Table 5. The two participants are the old marketDoc relationship rID of "5001" and the new market-Doc relationship rID of "5004." Though participants are listed in Table 6 with increasing values in the rID field, it is not necessary that the value of rID increase monotonically for the system to operate.

The "is a" relationship is a common relationship that also could be represented with entries in the Relationship Type, Participant Type, Relationship Instance and Participant Instance tables. However, better performance is achieved if all instances of an "is a" relationships are placed in an "Is_A" table. For one embodiment, an example Is_A table is shown in Table 7. For this example, all "product child of" relationships are kept in this Is_A table.

TABLE 7

Is_A Table.

| Concept Name | Parent Concept | Creation Date |
|---|---|---|
| Enterprise Network Device Product | Product | 4/12/2000 |
| Perseus | Enterprise Network Device Product | 4/12/2000 |
| AlphaPerseus | Perseus | 4/12/2000 |

Attributes of concepts and relationships beyond those already included in the above tables are kept in one or more attributes tables. In one embodiment, all these additional attributes of concepts are kept in a single concepts attributes table. Similarly, all additional attributes of relationships are kept in a single relationships attributes table. Table 8 is an example concepts attributes table for the example concepts described above.

TABLE 8

Concepts Attributes Table.

| Concept Name | Attribute Name | Attribute Value |
|---|---|---|
| BetaPerseus 2.0 | author | John Smith |

Table 9 is an example relationships attributes table for the example relationships described above. The expertise relationship was described above to include an attribute called "quality" for indicating the quality of the expertise using one of the values "unknown," "poor", "average," "good," and "excellent." This relationship type occurred in the relationship having rID of 5003 as shown above in Table 5. Therefore the corresponding entry in the relationships attributes table is given in Table 9.

TABLE 9

Relationships Attributes Table.

| rID | Attribute Name | Attribute Value |
|---|---|---|
| 5003 | quality | good |

The rules that express general computations and constraints on the relationships are also stored in tables. In this embodiment, the rules are stored as text for the high level logical processing language. In this way, the stored rules can be imported directly into a rules engine program of the high level logic expression and processing system. Table 10 is an example rules table including the reachable rule described above.

TABLE 10

Rules Table

| Rule Name | Rule Statement Sequence Number | Rule Statement |
|---|---|---|
| reachable | 1 | reachable(ConceptX, ConceptY) if (ConceptX, childOf, Concept Y) |
| reachable | 2 | reachable(ConceptX, ConceptY) if reachable(ConceptX, ConceptW), reachable(ConceptW, ConceptY) |

One embodiment of the VDF allows multiple concepts from different concept categories to have the same name. The duplicate names are converted to unique identifiers called DupIDs and the unique identifiers are used in the concept database. The duplicates table is used in the conversion process. Table 11 is an example duplicates table for an embodiment in which a product concept and a technology concept both use the name Perseus. In this case, the name inserted into the second row of Table 2 above would be "1234" instead of "Perseus."

TABLE 11

Duplicates Table

| DupID | Name | Category |
|---|---|---|
| 1234 | Perseus | Product |
| 2789 | Perseus | Technology |

One embodiment of the VDF also allows raw terms to be stored in the database. Raw terms are words or phrases that may become a concept at a later time. Raw terms can originate from a wide variety of sources, such as a trade journal article reviewing a product or a customer order. The raw terms are stored in this embodiment in a dedicated table. Table 12 is an example raw term table.

TABLE 12

The Raw Terms Table

| Raw Term Name | Description | Creation Date | Category |
|---|---|---|---|
| SuperPerseus | term for BetaPerseus 2.5 coined by Reviewer A. Newman | 12/12/2000 | Product |
| P-Routers | Term for Perseus routers in customer request from Company A | 9/25/2000 | Product |

4.0 Vocabulary Development Server

The Vocabulary Development Server (VDS) is one or more processes that provide management of and access to the enterprise data in the vocabulary database to other processes in an enterprise data processing system. Herein, the vocabulary database is also called the VDS Concept Database.

In the disclosed embodiment, the VDS includes several object-oriented application program interfaces (APIs). Several of the VDS APIs use function calls that are configured to allow client processes to interact with the database application without a need to know the organization of the database implementation. This allows modifications to be made to the database organization, such as adding relationships or adding or deleting levels to one or more hierarchies, without changing the client processes. All adjustments to changes in the database are accommodated in the VDS APIs.

Figure 4:
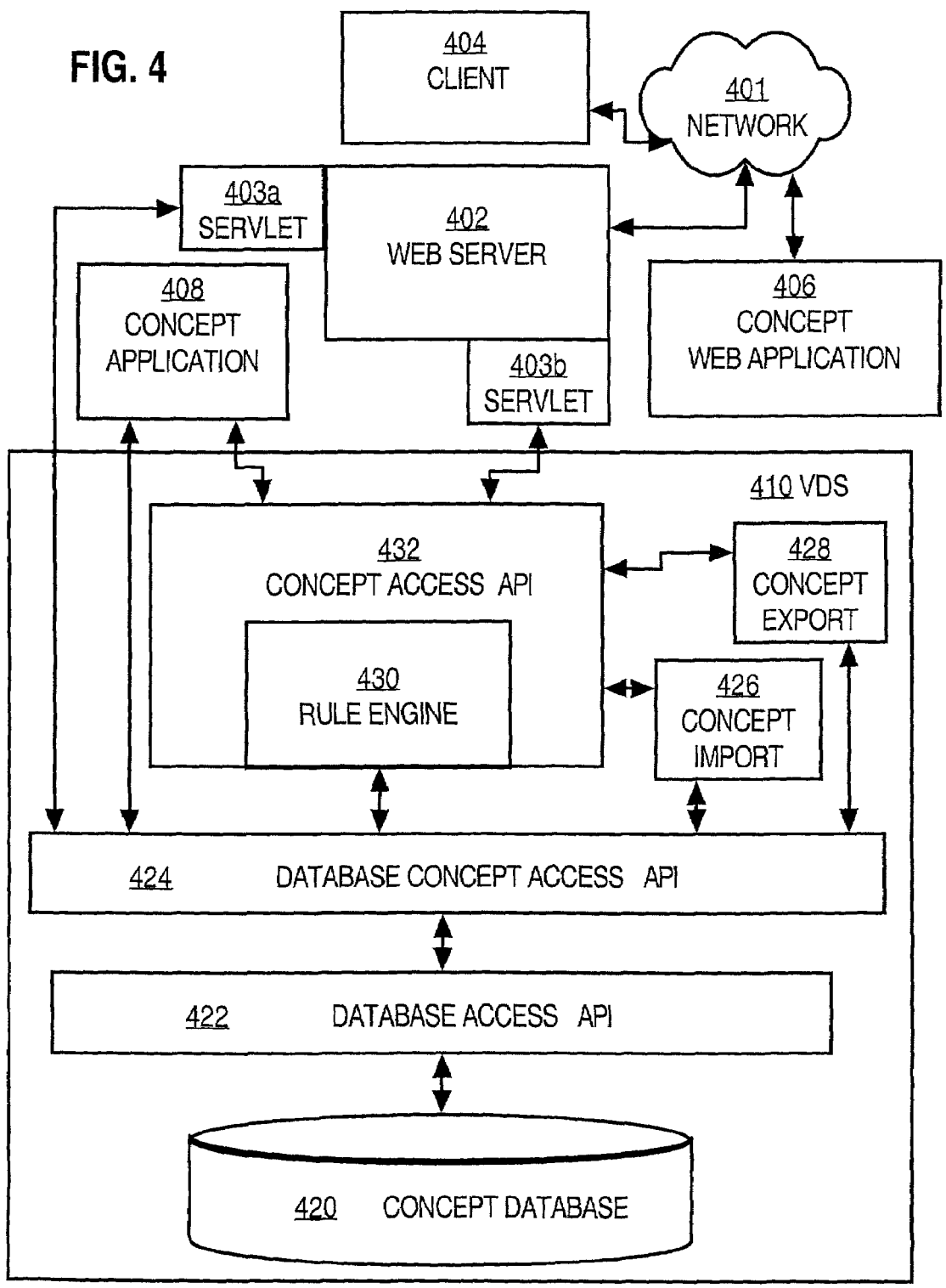
FIG. 4 is a block diagram illustrating a vocabulary data server and external applications according to one embodiment.

FIG. 4 is a block diagram showing the architecture of the VDS 410 and its relationship to some external processes. The VDS Concept database 420 is described above. A database access API 422 provides processes to operate on the database rows and tables based on knowledge of the database schema. These processes include connecting to the database, starting a transaction, such as adding, deleting or modifying a row in a table, committing the change in the row to the persistent storage, aborting a transaction, and disconnecting from the database. The database access API 422 also provides processes for adding, deleting, and modifying a raw term in the raw term table.

A database concept access API 424 provides processes for manipulating concepts, relationships and rules in the concept database without requiring knowledge of the actual database schema. For example, processes are included to return all the concepts in a given category, to generate and store a concept category, to add a concept to a category, to return sub-concepts (that is, concepts that are descendent of a given concept), to return child concepts, to return the parent concept of a given concept, to return ancestor concepts, to rename a given concept, to set the parent of a given concept, to delete a concept, and to return duplicate mapping. The database concept access API 424 also includes processes for manipulating relationships, such as to return all relationships, to return all relationship types, to return all "Is_A" relationships, to return all relationships of a given type, to generate and store a relationship type, to generate and store a relationship, to modify a participant or participant type in a relationship type, to modify a participant instance in a relationship instance and to delete a relationship. The database concept access API 424 includes processes for manipulating attributes, such as to return attribute information for all concepts in a given category, to set attribute information, to update attribute information, and to delete attribute information. The database concept access API 424 includes processes for manipulating rules, such as to return all rules in the rule table, to return all rules with a given name, to set the definition of a rule with a given name and sequence number, to generate and store a new rule with a given name and definition, to delete a given rule, and to delete rules with a given name.

The VDS database concept access API 424 is used by applications that are external to the VDS 410, such as concept application 408, and servlet 403a of Web Server 402. The VDS database concept access API 424 is also used by other processes within VDS 410, such as the concept import module 426 and the concept export module 428, and the rule engine 430 of the concept access API 432. All elements of FIG. 4 that are shown outside of VDS 410 are shown by way of example, and are not required. Further, the structural elements of VDS 410 are shown as examples and the specific architecture shown is not required.

The concept import module 426 is designed for the bulk import of a large amount of data, splitting that data into concepts, and storing the concepts in the concept database 420. The concept export module 428 is designed for the bulk export of a large number of related concepts and concept attributes to an external system, such as concept application 408, and client 404 or concept web application 406 through the web server 402 via servlet 403b.

The concept access API 432 provides processes for use by other applications that deal with groups of related concepts, or for responding to queries about concepts, relationships and rules that are received from external application programs. The API is used, for example, by the concept application 408 and servlet 403b of Web server 402 which are technically client processes of the VDS. Through network 401 and the Web server 402, a standalone client 404 such as a Web browser or a concept Web application 406 obtains and uses concept data. These are technically client processes of the Web server 402.

The concept access API 432 groups related concepts based on the requests made by the client processes. The concept definitions and relationships are checked to determine that constraints are not violated. Rules that are employed to define the computations or constraints employed by the concepts and relationships are obtained from the concept database 420 through the database concept access API 424, are converted to executable statements, and are executed by the rule engine 430 of the concept access API 432.

In one embodiment, the rule engine 430 is integrated with the concept access API 432 through the use of a foreign function facility of the PROLOG™ rule engine. This component provides service functions that enable the rule engine to access information, including rules expressed in text of a high level language, from the concept database 420 through the database concept access API 424. Rule execution functions can execute in the rule engine 430 the rules retrieved from the database 420. These functions marshal the function arguments (such as concepts/relationships/attribute) into the rule arguments, execute the PROLOG™ rule and retrieve any results, and un-marshal the rule results into a results set suitable for returning back to the client process, e.g., the calling application.

In this arrangement the concept database can be continually updated with new concepts, new hierarchies, new levels in old hierarchies, new relationships between hierarchies, and new rules, without requiring changes in the applications such as concept application 408, Web server 402, standalone client 404, or concept Web application 406. Any changes dictated by changes in the database 420 can be accommodated by changes in one or more of the APIs of the VDS, such as database access API 422, database concept access API, and concept access API 432.

5.0 Method od Processing Enterprise Data

Figure 5A:
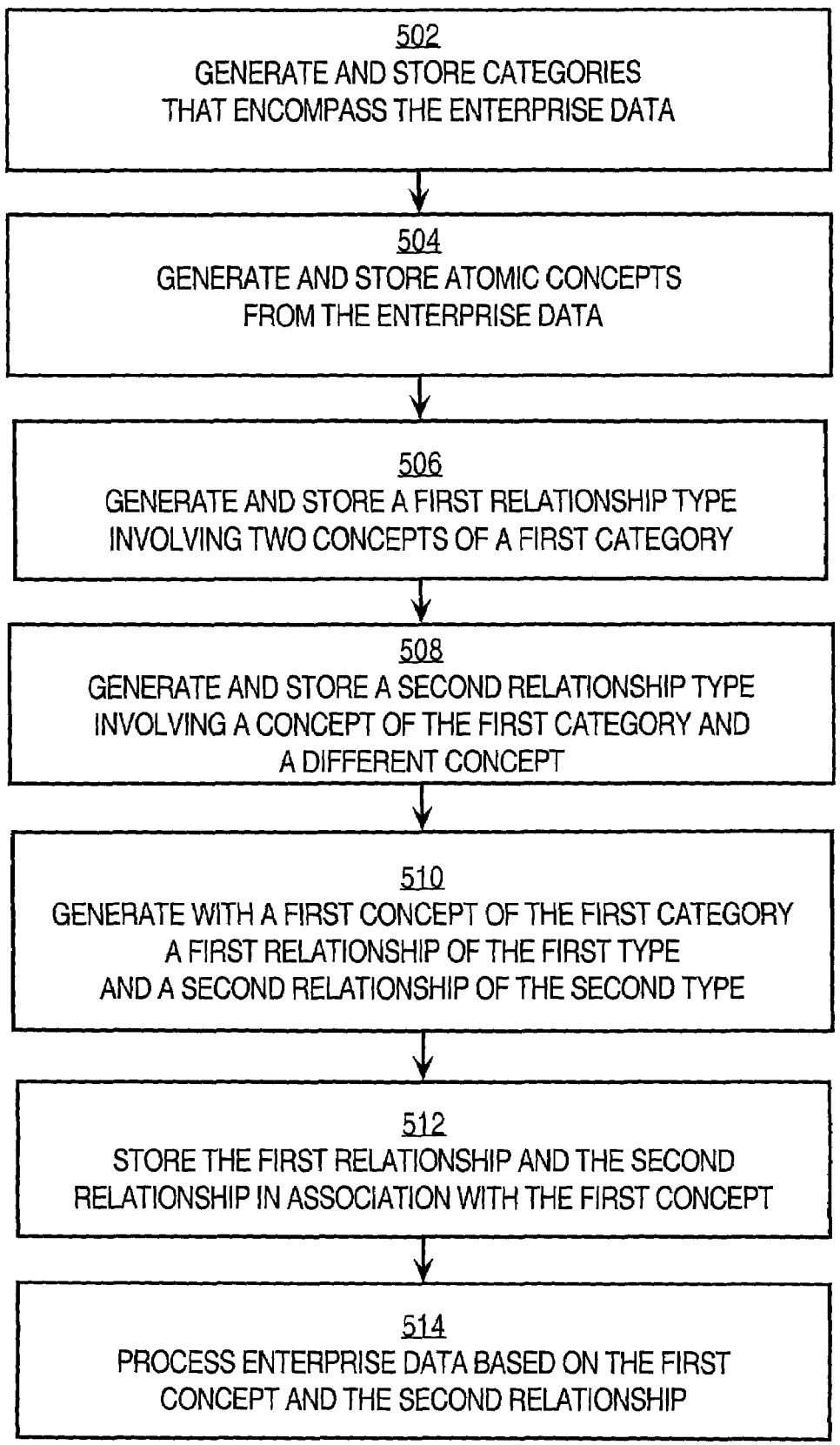
FIG. 5A is a flow chart illustrating a method for processing enterprise data according to one embodiment.

FIG. 5A is a flow chart depicting a method for processing enterprise data according to one embodiment. In step 502 multiple categories are generated and stored that encompass the enterprise data. For example, the categories "products," "documents," "technologies," "users" and "networking solutions" and are stored as root concepts in a Vocabulary table, as described above.

In step 504 multiple atomic concepts from the enterprise data are generated and stored. For example, "BetaPerseus 2.0" is generated and stored as a concept in the products table. "BetaPerseus 2.0" is an atomic concept in that it is not subdivided into separately referenced storage units. That is, it is not comprised of two or more subunits such as "Beta", "Perseus" and "2.0" that are stored separately.

In step 506 a first relationship type is generated and stored. The first relationship type relates two concepts associated with the first category, such as relating one product concept to another product concept which are both associated with the product category. For example, the "product child of" relationship relates one product concept to a product concept from which it was derived.

In step 508 a second relationship type is generated and stored. The second relationship type involves one of the two concepts associated with the first category and a different concept. In one embodiment, the different concept is a third concept in the same category. In another embodiment, the different concept is a concept in a different category.

An example embodiment in which the second relationship adds a new concept of the same category is described here. In this embodiment concepts are software routines. The first relationship defines paired routines in which one routine is used with another routine to produce a third routine. This first relationship is a 3-participant relationship among software routines. A second routine is different if it adds a fourth software routine to defines tripled software routines, in which three routines are combined to produce a fourth routine. This second relationship is a 4-participant relationship among software routines. It adds a different concept, a third combining routine, to the concepts in the first relationship.

An example of a relationship in which the different concept is in a different category is the marketDoc relationship, described above. In the marketDoc relationship a product concept in the product category is related to a document concept in a document category.

The generated relationship types are stored, according to one embodiment, in a relationship type table and a participant type table in which each participant type is associated with a relationship type by the relationship name, as described above.

In step 510 a relationship of the first type and a relationship of the second type are formed with a first concept. For example, a first relationship of type "product child of" and a second relationship of type "marketDoc" are formed with the concept "BetaPerseus 2.0." The first relationship, with rID=5000 in the Relationships Instance Table (Table 5), of the "product child of" type, is formed with the concept by referencing the concept by name as one of the participants in the Participant Instance Table (Table 6) with the relationship identification, rID=5000. The second relationship, with rID=5004 in the Relationships Instance Table (Table 5), of the "marketDoc" type, is formed with the concept by referencing the concept by name as one of the participants in the Participant Instance Table (Table 6) with the relationship identification, rID=5004.

In step 512, the first and second relationships are stored in association with the first concept. For example, rows of Tables 5 and 6 having rID 5000 and having rID 5004 are stored in a relational database and associated with the first concept BetaPerseus 2.0 by virtue of the name of the first concept occupying a participant field for at least one row for each rID.

In step 514, enterprise data is processed based on the first concept and the second relationship. For example, a user types "BetaPerseus 2.0" into a client process, such as concept application 408, and the client process sends a request to the concept access API 432 for documentation for the concept "BetaPerseus 2.0." Concept access API 432 runs a process to find a document type associated with a concept named "BetaPerseus 2.0." Concept access API 432 sends a request to a process of the database concept access API 424 for the category of "BetaPerseus 2.0" and gets "product" based on the "product child of" relationship. In this context, the "product child of" is the first relationship type, and the first relationship is rID in which BetaPerseus 2.0 is a child of BetaPerseus 1.0. Based on this relationship, the concept BetaPerseus 2.0 is not itself a document that can be returned.

Concept access API 432 then sends a request to a process of the database concept access API 424 for relationships associated with "BetaPerseus 2.0" and gets a list from Table 6 including rIDs of 5000, 5001, 5002, 5003, 5004. Concept access API 432 then sends a request to API 424 for the relationships types of these relationships and gets a list from Table 5 of product_child_of, marketDoc, product_child_of, expertise, and marketDoc, respectively. Concept access API 432 then sends a request to API 424 for the participant types of each of these relationships types and gets from Table 4 information that indicates only marketDoc includes a document participant type. Thus concept access API 432 determines that only rID 5001 and 5004 include document type participants. Concept access API 432 then checks for revision type relationships for rID 5001 and 5004 from the API 424 and receives relationship rID 5005, which indicates 5004 is a revision of 5001. The concept access API 432 then uses relationship 5004 to obtain the document for concept "BetaPerseus 2.0." In this context, the marketDoc is a relationship of a second type. The concept access API 432 sends the URL "http:///www.Enterprise.com/Hello/Chap2/" from relationship 5004 to the requesting application 408. The requesting application obtains the document from the given URL network resource address. In this context, the enterprise data processing system used the first concept "BetaPerseus 2.0" and a second relationship 5004 of the second relationship type, marketDoc, to process the enterprise data.

Figure 5B:
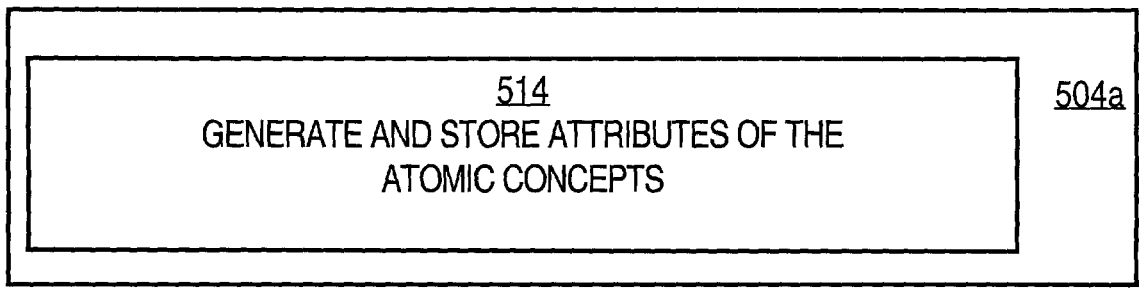
FIGS. 5B, 5C and 5D are flow charts illustrating further details about steps depicted in FIG. 5A in other embodiments.

FIG. 5B shows additional details according to embodiment 504a of step 504 from FIG. 5A. In step 514 attributes are generated and stored for one or more atomic concepts. For example, an "author" attribute having a value "John Smith" is stored in a relational database table as shown in Table 8 above.

Figure 5C:
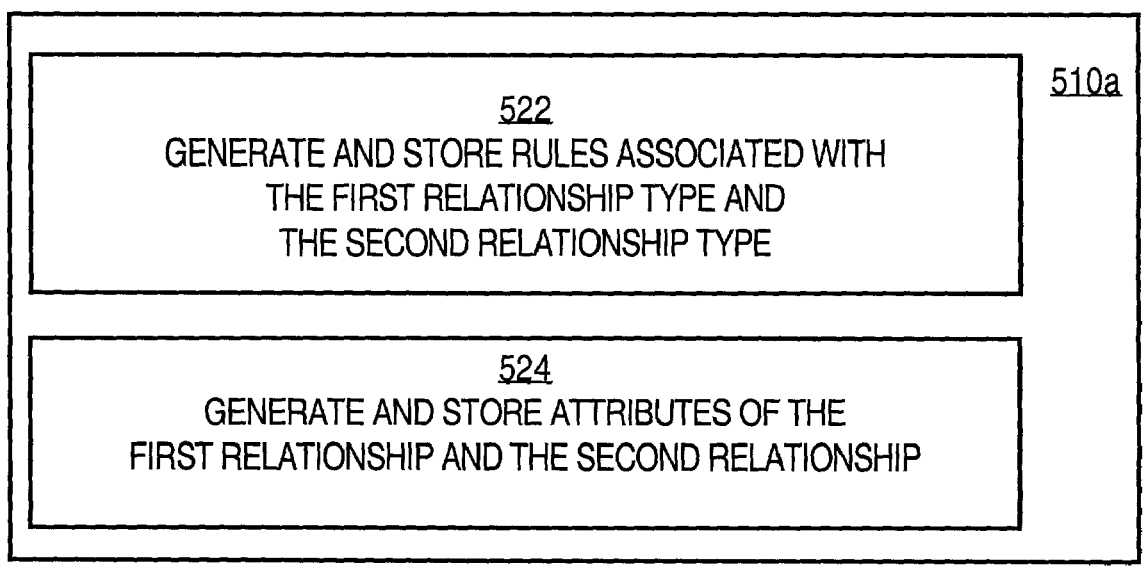

FIG. 5C shows additional details according to embodiment 510a of step 510 from FIG. 5A. In step 522 rules associated with the first relationship type and the second relationship type are generated and stored. For example, the rule for computing whether a ConceptY is reachable from a ConceptX is stored in two records of a rule relational database table as shown in Table 10 above. The records indicate the rule name, a sequence number for the record in establishing the rule, and a statement in a high level logical processing language that can be implemented by a rule engine. This rule is associated with a relationship type when a constraint is placed on a participant in a relationship. For example, for a concept "BetaPerseus 2.0" to be a product type participant filling the product role in an expertise relationship, as expressed in Table 4 above, the concept "product" must be reachable by the concept "BetaPerseus 2.0." Thus the rule reachable is associated with the relationship expertise as a constraint on the participants in each role.

In step 524 attributes are generated and stored for one or more relationships. For example, a "quality" attribute having a value "good" is stored in a row associated with relationship 5003 of a relationships attributes relational database table as shown in Table 9 above.

Figure 5D:
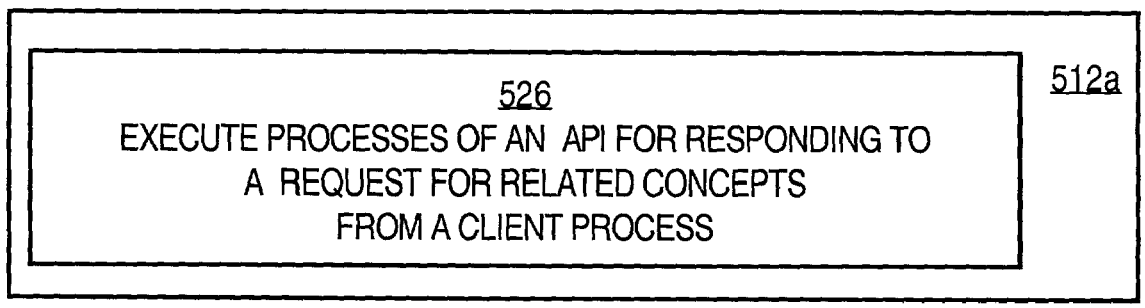

FIG. 5D shows additional details according to embodiment 512a of step 512 from FIG. 5A. In step 526 an application program interface is executed as a set of one or more processes to respond to requests for related concepts from a client process. For example, concept access API 432 or database concept access API 424 execute to respond to frequent or particular requests for related concepts from concept application 408 or Web server 402, as shown in FIG. 4.

6.0 Hardware Overview

Figure 6:
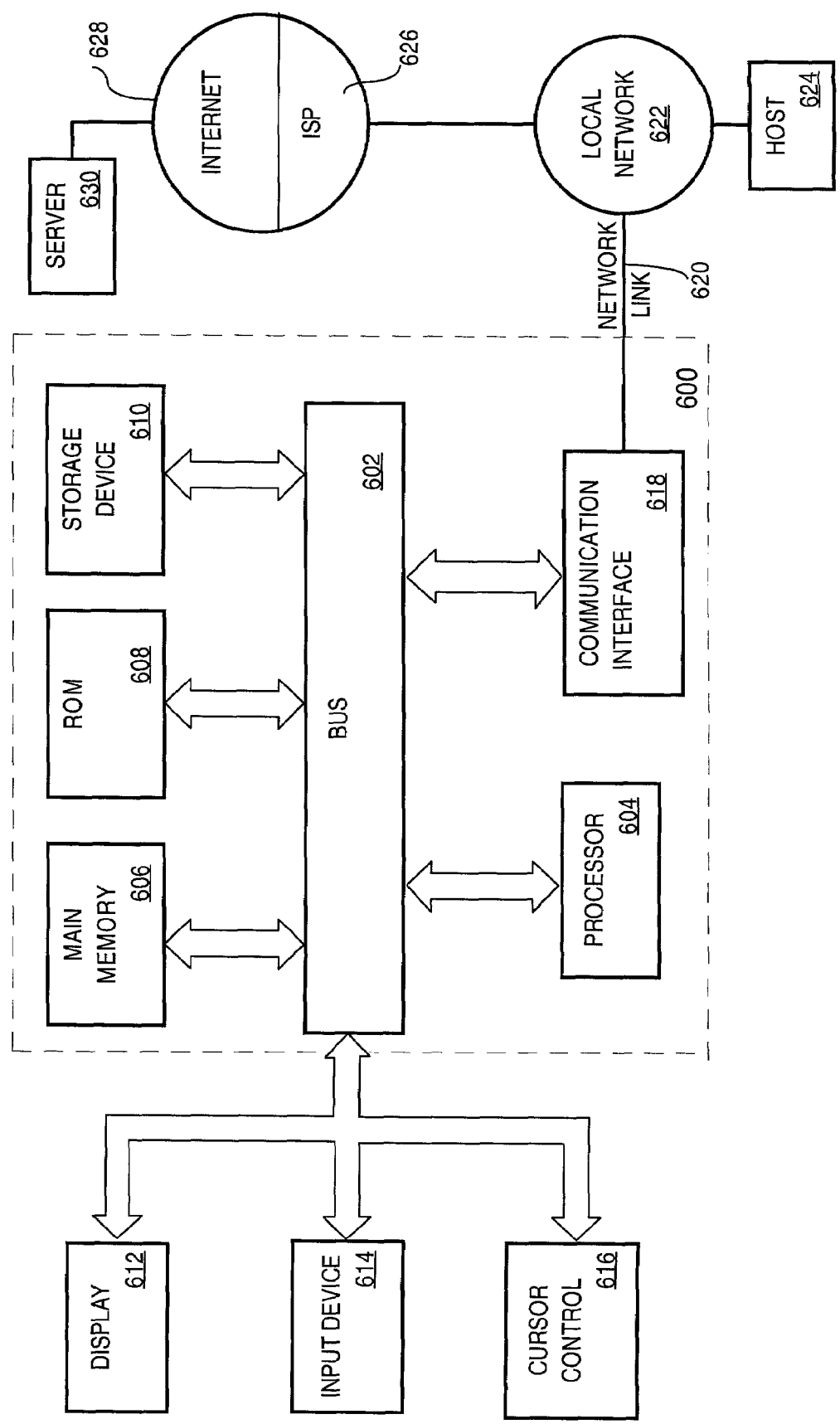
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for a vocabulary data server. According to one embodiment of the invention, a vocabulary data server is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for a concept access API as described herein.

The received code may be executed by processor 604 as it is received, and/or stored in storage device 610, or other non-volatile storage for later execution. In this manner, computer system 600 may obtain application code in the form of a carrier wave.

7.0 Scope

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing data, the method comprising the machine-implemented steps of:
    storing a first relationship between a first concept and a second concept, wherein:
        the first concept and the second concept are each one of a plurality of atomic concepts;
        the first concept and the second concept are in a first category of concepts; and
        the first relationship is part of a first concept graph corresponding to the first category of concepts; and
    storing a second relationship between the first concept and a third concept, wherein:
        the third concept is one of the plurality of atomic concepts;
        the first concept and the third concept are in a second category of concepts; and
        the second relationship is part of a second concept graph corresponding to the second category of concepts;
        wherein the first concept, the second concept, and third concept are each different concepts; the first category is distinct from the second category; and the first concept graph is distinct from the second concept graph;
    wherein the method further comprises:
    receiving a request for information related to the second concept;
    sending a response to the request, wherein the response comprises information related to the third concept and the response is generated based on the first relationship, the second relationship, and the third concept;
    wherein:
        the first category is one of a products category, a services category, an activities category and a document category; and
        the second category is a different one of the products category, the services category, the activities category and the document category.

2. A method of processing data, the method comprising the machine-implemented steps of:
    storing a first relationship between a first concept and a second concept, wherein:
        the first concept and the second concept are each one of a plurality of atomic concepts;
        the first concept and the second concept are in a first category of concepts; and
        the first relationship is part of a first concept graph corresponding to the first category of concepts; and
    storing a second relationship between the first concept and a third concept, wherein:
        the third concept is one of the plurality of atomic concepts;
        the first concept and the third concept are in a second category of concepts; and
        the second relationship is part of a second concept graph corresponding to the second category of concepts;
        wherein the first concept, the second concept, and third concept are each different concepts; the first category is distinct from the second category; and the first concept graph is distinct from the second concept graph;
        wherein the method further comprises:
    receiving a request for information related to the second concept;
    sending a response to the request, wherein the response comprises information related to the third concept and the response is generated based on the first relationship, the second relationship, and the third concept.

3. The method as recited in claim 2, further comprising the step of processing enterprise data based on the first concept and the second relationship.

4. The method as recited in claim 2, wherein the second relationship is of a second relationship type, and wherein the second relationship type relates three or more concepts of the plurality of atomic concepts.

5. The method as recited in claim 2, wherein the second relationship is of a second relationship type, and wherein the second relationship type relates at least one concept of the plurality of atomic concepts associated with the first category to at least another concept of the plurality of atomic concepts associated with the second category.

6. The method as recited in claim 2, wherein concepts in the first category are represented as nodes connected by relationships of a first relationship type along one or more branches of a first type hierarchy to a first root node representing a first root concept for the first category.

7. The method as recited in claim 6, wherein the first root node has a "child of" relationship to an enterprise data root node representing an enterprise data root concept.

8. The method as recited in claim 7, wherein a second root node corresponding to a second root concept for the second category has a "child of" relationship to the enterprise data root node.

9. The method as recited in claim 2, wherein an association among the first concept and the first relationship and the second relationship is provided by a relational database.

10. The method as recited in claim 2, wherein the first concept is stored as a record in a first data store table, said record including a concept name field for storing a name of the first concept.

11. The method as recited in claim 10, wherein every record in the first data store table stores a name of a concept of the plurality of atomic concepts associated with the first category.

12. The method as recited in claim 2, wherein the first relationship is stored as a first unique record in a relationship data store table, said first unique record including a relationship type field for storing a name of a first relationship type.

13. The method as recited in claim 12, wherein a name of the first concept is stored in a participant field in a record in a relationship participant data store table, said record including a relationship identification field for storing data indicating the first unique record in the relationship data store table.

14. The method as recited in claim 12, wherein the second relationship is stored as a second unique record in the relationship data store table, said second unique record storing a name of a corresponding second relationship type in the relationship type field.

15. The method as recited in claim 14, wherein a name of the first concept is stored in a participant field in a first record in a relationship participant data store table, said first record including a relationship identification field for storing data indicating the second unique record in the relationship data store table.

16. The method as recited in claim 14, wherein a name of the first concept is stored in a participant field in a first record in a relationship participant data store table, said first record including a relationship identification field for storing data indicating the first unique record in the relationship data store table.

17. The method as recited in claim 16, wherein the name of the first concept is stored in the participant field in a second record in the relationship participant data store table, said second record storing data in the relationship identification field for indicating the second unique record in the relationship data store table.

18. The method as recited in claim 13, wherein a name of a role for the first concept is stored in a role field in the record in the relationship participant data store table.

19. The method as recited in claim 2, wherein one or more attributes of at least one of the first concept, the first relationship, and the second relationship are stored in an attributes data store table.

20. The method as recited in claim 2, further comprising generating and storing a rule associated with at least one of a first relationship type, a second relationship type, and a category.

21. The method as recited in claim 20, wherein the rule constrains a given concept which may be related to the first concept by the at least one of the first relationship type, the second relationship type, and the category.

22. The method as recited in claim 20, wherein the rule is stored in a relational database table.

23. A method of processing enterprise data generated by an enterprise, the method comprising the machine-implemented steps of:
   generating a plurality of categories that encompass the enterprise data;
   generating a plurality of atomic concepts within the enterprise data;
   generating a first relationship type to relate at least two concepts of the plurality of atomic concepts associated with a first category of the plurality of categories;
   generating a second relationship type, wherein the second relationship type relates at least one concept of the plurality of atomic concepts associated with the first category to at least another concept of the plurality of atomic concepts associated with a second category of the plurality of categories;
   storing a first concept of the plurality of atomic concepts, said first concept associated with the first category;
   generating a first relationship of the first relationship type with the first concept and a second concept, wherein the second concept is associated with the first category;
   generating a second relationship of the second relationship type with the first concept and a third concept, wherein the third concept is associated with the second category;
   storing the first relationship and the second relationship in association with the first concept;
   receiving a request for information related to the second concept;
   sending a response to the request, wherein the response comprises information related to the third concept and the response is generated based on the first relationship, the second relationship, and the third concept.

24. The method as recited in claim 23, further comprising the step of processing some data of the enterprise data based on the first concept and the second relationship.

25. The method as recited in claim 23, wherein the second relationship type relates three or more concepts of the plurality of atomic concepts.

26. The method as recited in claim 23, wherein concepts in the first category are represented as nodes connected by relationships of the first relationship type along one or more branches of a first type hierarchy to a first root node representing a first root concept for the first category.

27. The method as recited in claim 26, wherein the first root node has a "child of" relationship to an enterprise data root node representing an enterprise data root concept.

28. The method as recited in claim 27, wherein a second root node corresponding to a second root concept for the second category of the plurality of categories has a "child of" relationship to the enterprise data root node.

29. The method as recited in claim 23, wherein an association among the first concept, the first relationship and the second relationship is provided by a relational database.

30. The method as recited in claim 23, said step of storing the first concept further comprising:
   storing the first concept as a record in a first data store table; and
   storing a name of the first concept in a concept name field in said record.

31. The method as recited in claim 30, wherein every record in the first data store table stores a name of a concept of the plurality of atomic concepts associated with the first category.

32. The method as recited in claim 23, said step of storing the first relationship and the second relationship further comprising:
   storing the first relationship as a first unique record in a relationship data store table; and
   storing a name of the first relationship type in a relationship type field in said first unique record.

33. The method as recited in claim 32, said step of storing the first relationship and the second relationship further comprising:
   storing a name of the first concept in a participant field in a record in a relationship participant data store table; and
   storing in a relationship identification field in said record in the relationship participant data store table, data indicating the first unique record in the relationship data store table.

34. The method as recited in claim 32, said step of storing the first relationship and the second relationship further comprising:
storing the second relationship as a second unique record in the relationship data store table; and
storing a name of the second relationship type in the relationship type field in said second unique record.

35. The method as recited in claim 34, said step of storing the first relationship and the second relationship further comprising:
storing a name of the first concept in a participant field in a first record in a relationship participant data store table; and
storing in a relationship identification field in said first record in the relationship participant data store table, data indicating the second unique record in the relationship data store table.

36. The method as recited in claim 34, said step of storing the first relationship and the second relationship further comprising:
storing a name of the first concept in a participant field in a first record in a relationship participant data store table; and
storing in a relationship identification field in said first record in the relationship participant data store table, data indicating the first unique record in the relationship data store table.

37. The method as recited in claim 36, said step of storing the first relationship and the second relationship further comprising:
storing the name of the first concept in the participant field in a second record in the relationship participant data store table; and
storing in the relationship identification field in said second record in the relationship participant data store table, data indicating the second unique record in the relationship data store table.

38. The method as recited in claim 33, said step of storing the first relationship and the second relationship further comprising storing a name of a role for the first concept in a role field in the record in the relationship participant data store table.

39. The method as recited in claim 23, said step of storing the first relationship and the second relationship further comprising storing one or more attributes of at least one of the first concept and the first relationship and the second relationship in an attributes data store table.

40. The method as recited in claim 23, further comprising generating and storing a rule associated with at least one of the first relationship type and the second relationship type and a category of the plurality of categories.

41. The method as recited in claim 40, wherein the rule constrains a given concept which may be related to the first concept by the at least one of the first relationship type and the second relationship type.

42. The method as recited in claim 40, said step of generating and storing the rule further comprising storing the rule in a relational database table.

43. A computer-readable medium carrying one or more sequences of instructions for processing enterprise data generated by an enterprise, which instructions, when executed by one or more processors, cause the one or more processors to carry out the steps of:
generating a plurality of categories that encompass the enterprise data;
generating a plurality of atomic concepts within the enterprise data;
generating a first relationship type to relate at least two concepts of the plurality of atomic concepts associated with a first category of the plurality of categories;
generating a second relationship type, wherein the second relationship type relates at least one concept of the plurality of atomic concepts associated with the first category to at least another concept of the plurality of atomic concepts associated with a second category of the plurality of categories;
storing a first concept of the plurality of atomic concepts, said first concept associated with the first category;
generating a first relationship of the first relationship type with the first concept and a second concept, wherein the second concept is associated with the first category;
generating a second relationship of the second relationship type with the first concept and a third concept, wherein the third concept is associated with the second category; and
storing the first relationship and the second relationship in association with the first concept.

44. A system for processing enterprise data generated by an enterprise, comprising
a means for generating a plurality of categories that encompass the enterprise data;
a means for generating a plurality of atomic concepts within the enterprise data;
a means for generating a first relationship type to relate at least two concepts of the plurality of atomic concepts associated with a first category of the plurality of categories;
a means for generating a second relationship type, wherein the second relationship type relates at least one concept of the plurality of atomic concepts associated with the first category to at least another concept of the plurality of atomic concepts associated with a second category of the plurality of categories;
a means for storing a first concept of the plurality of atomic concepts, said first concept associated with the first category;
a means for generating a first relationship of the first relationship type with the first concept and a second concept, wherein the second concept is associated with the first category;
a means for generating a second relationship of the second relationship type with the first concept and a third concept, wherein the third concept is associated with the second category; and
a means for storing the first relationship and the second relationship in association with the first concept.

45. A system for processing enterprise data generated by an enterprise, comprising:
a computer readable persistent storage medium; and
a processor configured for
generating a plurality of categories that encompass the enterprise data,
generating a plurality of atomic concepts within the enterprise data,
generating a first relationship type to relate at least two concepts of the plurality of atomic concepts associated with a first category of the plurality of categories,
generating a second relationship type, wherein the second relationship type relates at least one concept of the plurality of atomic concepts associated with the first category to at least another concept of the plurality of atomic concepts associated with a second category of the plurality of categories;

generating a first relationship of the first relationship type with the first concept second concept, wherein the second concept is associated with the first category;

generating a second relationship of the second relationship type with the first concept and a third concept, wherein the third concept is associated with the second category;

storing on the persistent storage medium the first concept; and storing on the persistent storage medium the first relationship and the second relationship in association with the first concept.

46. A computer-readable medium carrying one or more sequences of instructions for processing data which instructions, when executed by one or more processors, cause the one or more processors to carry out the steps of:

storing a first relationship between a first concept and a second concept, wherein:
the first concept and the second concept are each one of a plurality of atomic concepts;
the first concept and the second concept are in a first category of concepts; and
the first relationship is part of a first concept graph corresponding to the first category of concepts; and storing a second relationship between the first concept and a third concept, wherein:
the third concept is one of the plurality of atomic concepts;
the first concept and the third concept are in a second category of concepts; and
the second relationship is part of a second concept graph corresponding to the second category of concepts;

wherein the first concept, the second concept, and third concept are each different concepts; the first category is distinct from the second category; and the first concept graph is distinct from the second concept graph.

47. The computer-readable medium of claim 46, wherein the computer-readable medium further comprises one or more sequences of instructions, which instructions, when executed by one or more processors, cause the one or more processors to carry out the step of:

receiving a request for information related to the second concept;

sending a response to the request, wherein the response comprises information related to the third concept and the response is generated based on the first relationship, the second relationship, and the third concept.

48. A system for processing data, comprising:

means for storing a first relationship between a first concept and a second concept, wherein:
the first concept and the second concept are each one of a plurality of atomic concepts;
the first concept and the second concept are in a first category of concepts; and
the first relationship is part of a first concept graph corresponding to the first category of concepts; and means for storing a second relationship between the first concept and a third concept, wherein:
the third concept is one of the plurality of atomic concepts;
the first concept and the third concept are in a second category of concepts; and
the second relationship is part of a second concept graph corresponding to the second category of concepts;

wherein the first concept, the second concept, and third concept are each different concepts; the first category is distinct from the second category; and the first concept graph is distinct from the second concept graph.

49. The system of claim 48, further comprising:

means for receiving a request for information related to the second concept;

means for sending a response to the request, wherein the response comprises information related to the third concept and the response is generated based on the first relationship, the second relationship, and the third concept.

50. A system for responding for processing data, the system comprising:

a database for storing concepts and relationships among concepts; and a processor configured as an applications programming interface for responding to the requests for information related to one or more concepts, wherein, storing a first relationship between a first concept and a second concept, wherein:
the first concept and the second concept are each one of a plurality of atomic concepts;
the first concept and the second concept are in a first category of concepts; and
the first relationship is part of a first concept graph corresponding to the first category of concepts; and storing a second relationship between the first concept and a third concept, wherein:
the third concept is one of the plurality of atomic concepts;
the first concept and the third concept are in a second category of concepts; and
the second relationship is part of a second concept graph corresponding to the second category of concepts;

wherein the first concept, the second concept, and third concept are each different concepts; the first category is distinct from the second category; and the first concept graph is distinct from the second concept graph.

51. The system of claim 50, the system further comprising:

receiving a request for information related to the second concept;

sending a response to the request, wherein the response comprises information related to the third concept and the response is generated based on the first relationship, the second relationship, and the third concept.

* * * * *